United States Patent [19]

Mueller

[11] Patent Number: 5,010,141
[45] Date of Patent: Apr. 23, 1991

[54] REACTIVE SILICONE AND/OR FLUORINE CONTAINING HYDROPHILIC PREPOLYMERS AND POLYMERS THEREOF

[75] Inventor: Karl F. Mueller, New York, N.Y.

[73] Assignee: Ciba-Geigy Corporation, Ardsley, N.Y.

[21] Appl. No.: 510,504

[22] Filed: Apr. 18, 1990

Related U.S. Application Data

[63] Continuation-in-part of Ser. No. 427,266, Oct. 25, 1989, Pat. No. 4,463,471.

[51] Int. Cl.$^5$ .................. C08F 259/00; C08F 18/20
[52] U.S. Cl. ................................. 525/276; 525/288; 526/245; 526/279
[58] Field of Search ............... 525/276, 288; 526/245, 526/279

[56] References Cited

U.S. PATENT DOCUMENTS

| | | |
|---|---|---|
| 3,220,960 | 11/1965 | Wichterle et al. |
| 3,928,299 | 12/1975 | Rosenkranz et al. |
| 4,136,250 | 1/1979 | Mueller et al. |
| 4,139,513 | 2/1979 | Tanaka et al. |
| 4,139,692 | 2/1979 | Tanaka et al. |
| 4,182,822 | 1/1980 | Chang. |
| 4,343,919 | 8/1982 | Tefertiller et al. |
| 4,343,927 | 8/1982 | Chang. |
| 4,383,091 | 5/1983 | Burton. |
| 4,433,111 | 2/1984 | Tighe et al, . |
| 4,493,910 | 1/1985 | Tighe et al. |
| 4,548,983 | 10/1985 | Yokota et al. |
| 4,605,712 | 8/1986 | Mueller et al. |
| 4,638,040 | 1/1987 | Hammar. |
| 4,640,965 | 2/1987 | Falcetta et al. |
| 4,650,843 | 3/1987 | Yokoyama et al. |

FOREIGN PATENT DOCUMENTS

| | | | |
|---|---|---|---|
| 60-90855 | 5/1985 | Japan | 526/245 |
| 62-25104 | 2/1987 | Japan | 525/276 |
| 63-159820 | 7/1988 | Japan | 526/245 |
| 64-11116 | 1/1989 | Japan | 526/245 |

Primary Examiner—Joseph L. Schofer
Assistant Examiner—N. Sarofim
Attorney, Agent, or Firm—Luther A. R. Hall

[57] ABSTRACT

Vinyl unsaturated copolymers are described which are obtained in a two-step process and which consist of monomeric units A, B, C, D and E, copolymerized in a first step, and in a second step reacted with a reactive vinyl monomer $M_v$, and in which A is a siloxane or fluorine containing vinyl monomer, 30–70% by weight; B is N,N-dimethylacrylamide or N-vinylpyrrolidone, 30–70% by weight; C is an active hydrogen containing vinyl monomer, 0.5–25% by weight; D are other copolymerizable comonomers, 0–30% by weight, and E is a chain transfer agent, 0–10 mol percent. $M_v$ is a vinyl unsaturated isocyanate.

These vinyl unsaturated polymers are useful, either by themselves or in combination with other copolymerizable vinyl monomers, as heat or UV-curable coatings or glass, plastic, wood, paper, textiles, metal or ceramics, said coatings possessing low surface energies and low refractive indices. They are especially useful as UV-curable hydrophilic coatings and water-swelling biocompatible polymers, especially fully molded highly oxygen-permeable contact lenses.

17 Claims, No Drawings

REACTIVE SILICONE AND/OR FLUORINE CONTAINING HYDROPHILIC PREPOLYMERS AND POLYMERS THEREOF

This is a continuation-in-part application of application Ser. No. 427,266, filed on Oct. 25, 1989 now U.S. Pat. No. 4,463,471.

BACKGROUND OF THE INVENTION

Beginning with the introduction of poly-(2-hydroxyethyl methacrylate) (poly-HEMA) by Wichterle (U.S. Pat. No. 3,220,960), hydrogels, that is water-insoluble, but water-swollen polymers have become ever more important as components in biomedical application, be they implants, prostheses or drug delivery devices, due to their excellent biocompatibility and permeability. Poly-HEMA based hydrogels have become the major soft contact lens material due to their outstanding comfort characteristics and sufficiently high oxygen permeability ($O_2.DK$). Soft contact lenses conform very tightly to the cornea and therefore, at ~0.1 mm thickness, need to have an $O_2.DK$ of at least 5–6 barrers, if damage to the cornea is to be prevented during daily wear.

The $O_2.DK$ of an acrylic polymer, which does not contain either silicone or fluorine, is primarily determined by its water content and rises from zero at zero % $H_2O$ to 6.5 at ~39% $H_2O$ (for poly-HEMA), 12.5 at ~50% $H_2O$ to at 23~60% $H_2O$. However, as the water content is increased, hydrogel strength is drastically decreased and in order to maintain durability lens thickness has to be increased. This in turn counteracts the higher $O_2.DK$, because it reduces oxygen-transmissibility, $P=O_2DK/l$ ($l$=lens thickness).

It is highly desirable to have a contact lens material, or indeed a hydrogel for biomedical applications in general, which is strong, comfortable to wear and has an inherently much higher $O_2.DK$ than conventional hydrogels. Such hydrogels can be made by incorporation of other oxygen-flux enhancing groups into the polymer, most notably siloxane groups and fluoroalkyl groups.

Both types of hydrogels have been described in the prior art. Polysiloxane-dimethacrylate as well as polysiloxane-block-polyethyleneoxide dimethacrylate copolymers with water soluble vinyl monomers have been described in U.S. Pat. No. 4,136,250 for use in drug delivery, but also for contact lens applications; similar compositions are disclosed in U.S. Pat. No. 4,605,712.

Although these polymers show excellent strength and toughness, they are limited in the amount of siloxane groups which can be incorporated without producing phase-separation and opacity because the siloxane is part of a rather high molecular weight polysiloxane block.

Larger amounts of siloxane groups can be built into clear hydrogels, if oligosiloxanyl-silyl alkyl (meth)-acrylates are used as comonomers; a more random distribution of siloxane groups prevents the formation of large, incompatible domains.

Such oligosiloxanyl-silyl groups containing hydrogels of prior art, which are useful as contact lens materials are disclosed in U.S. Pat. No. 4,139,692 and U.S. Pat. No. 4,139,513, specifying tri-siloxy alkylmethacrylate, with the OH-group required for compatibility.

U.S. Pat. No. 4,182,822 and U.S. Pat. No. 4,343,927 describe N-vinyl pyrrolidone and $C_1$–$C_4$-dialkyl acrylamide-copolymers with oligosiloxanyl alkylenemethacrylates.

The following patents describe prior art compositions consisting of fluorinated hydrogels. U.S. Pat. No. 4,433,111, and U.S. Pat. No. 4,493,910 describes hydrogels and contact lenses obtained by copolymerization of 20–40 mol % substituted or unsubstituted acrylamide or methacrylamide., 25–55 mol % N-vinylpyrrolidone (NVP); 5–10% mol hydroxy-alkyl(meth)-acrylate., 1–10 mol % (meth)-acrylic acid, and 1–9 mol % of a perfluoroalkyl-alkylene (meth)acrylate; the perfluoroalkyl groups act to reduce protein deposition.

U.S. Pat. No. 4,640,965, describes hydrogels and contact lenses obtained by copolymerization of hydroxyfluoroalkyl styrene (5–60%, by weight) with hydroxyalkyl (meth)-acrylates or N-vinylpyrrolidone (40–95%, by weight); the hydroxy group is necessary to attain the required compatibility.

U.S. Pat. No. 4,638,040 describes the synthesis of 1,3-bis(trifluoroacetoxy) propyl-2-methacrylate polymers and their use as hydrogel-contact lens materials and ocular implants after hydrolysis.

U.S. Pat. No. 4,650,843 describes hydrogel contact lens materials consisting essentially of copolymers of 59–95% (by weight) of 2-hydroxyethyl methacrylate and 5–35% (by weight) of fluorinated methacrylates with up to 5 F-atoms.

In most cases the range of clear compositions is very limited; the commercially available fluorinated (meth)acrylates can be incorporated in only relatively small amounts; alternatively, complicated, hydroxylated F-monomers have to specially be synthesized to achieve better solubility in NVP or HEMA (U.S. Pat. No. 4,640,965).

In copending patent application Ser. No. 356,801 now U.S. Pat. No. 4,954,587 we have described unique, highly oxygen permeable fluorinated hydrogels which are copolymers of perfluoroalkyl substituted (meth)-acrylates and N,N-dimethyl-acrylamide.

In all the prior art examples low molecular weight monomers serve as starting material s for the polymerization. While this is convenient for doing bulk-polymerizations in a closed mold, it is less practical for curing of films or surface coatings, for example by UV-irradiation; then large amounts of monomers can evaporate, posing health hazards ad irreproducibly altering the composition of the coating. Also, because of the high concentration of reactive double bonds during bulk polymerization, and the exothermic nature of the reaction, temperature is often difficult to control and shrinkage can occur in the mold as well. On the other hand, if solution polymerizations are carried out, as is sometimes desirable when otherwise incompatible comonomers have to be combined, long polymerization times are required to achieve high conversions of monomers.

It has now been discovered that linear, water soluble copolymers with a high siloxane and/or fluorine content and pendent vinyl unsaturated groups can be prepared in high yield, which are ideally suited to make by UV-curing water swellable and oxygen permeable coatings and films or shaped articles, like contact lenses. These linear unsaturated copolymers, hereinafter called prepolymers, are made in a two-step process by:

(1) copolymerization, in bulk or in solution of A) oligosiloxanylsilyl-alkyl methacrylates or perfluoroalkyl substituted alkyl acrylates or methacrylates as oxygen flux enhancing comonomers; (B) a comonomer mixture consisting of a N,N-dimethylacrylamide or N-vinylpyrrolidone as main hydrophilic comonomers; (C) active hydrogen containing vinyl comonomers such as primary or secondary-amino alkyl- or hydroxy alkyl vinyl compounds; (D) optionally other copolymerizable ethylenically unsaturated monomers; and (E) also optionally, a chain transfer agent; followed by:

(2) reaction with a isocyanato substituted ethylenically unsaturated monomer ($M_v$), 0.1 to 10 mol %, based on $C_2$-mer units of the prepolymer chain.

Vinyl unsaturated prepolymers, obtained by reaction of an active hydrogen containing prepolymer with a vinylunsaturated isocyanate, which do however not contain silicone or fluorine, have been described in the literature;

for example in U.S. Pat. No. 3,928,299, which discloses very broadly an unsaturated polymer of over 1000 MW; neither silicone fluorine or hydrogels are mentioned or disclosed; in U.S. Pat. No. 4,548,983, which describes hydrogels based on alkylene glycol-mono-(meth)acrylates, not N,N-dimethylacrylamide or N-vinylpyrrolidone, and which are made as shaped hydrogel articles by solution polymerization in a mold, also without fluorine or silicone.

U.S. Pat. No. 4,383,091 discloses the reaction product of a poly-hydroxy substituted polyglycidyl ether with 2-isocyanatoethyl methacrylate.

Vinyl unsaturated prepolymers obtained by reaction of a 2-isocyanatoethyl methacrylate copolymer with, for example, 2-hydroxyethyl methacrylate, are described in U.S. Pat. No. 4,343,919.

No unsaturated, linear, water soluble or, after a final crosslinking step, highly water swellable copolymers have been described, which are at the same time high in fluorine or silicone content.

It is an object of this invention to provide an easily polymerizable fluorine and/or silicone containing hydrophilic prepolymer; it is a further object of this invention to provide a highly water swellable, fluorine and/or silicone containing crosslinked polymer with high oxygen permeability, which is obtained by free radical polymerization of the hydrophilic prepolymer either by itself or in combination with up to 50% by weight of other copolymerizable vinyl monomers M-2.

DETAILED DISCLOSURE

The instant invention pertains to a hydrophilic prepolymer containing silicon or fluorine or both silicon and fluorine as well as ethylenically unsaturated groups, which is the reaction product of the random copolymer of, the weight percent amounts of components (A), (B), (C), (D), and (E) being based on the total amount of said components, (A) 20 to 79.5% by weight of a silicon or fluorine containing vinyl monomers or mixtures thereof.

(B) 79.5 to 20% by weight of N,N-dimethylacrylamide, N-vinylpyrrolidone or N-vinylacetamide or mixtures thereof.

(C) 0.5–25% by weight of a vinyl monomer containing an active hydrogen atom or mixtures thereof.

(D) 0 to 30% by weight of an ethylenically unsaturated monomer or mixtures thereof other than a monomer of component (A), (B) or (C), (E) 0 to 10 mol %, based on the total moles of components (A), (B), (C), (D) and (E) of a chain transfer agent, with ($M_v$) 0.2 to 10 mol %, based on the total moles of component (A), (B), (C), (D) and (E), of an ethylenically unsaturated isocyanate.

The prepolymer is synthesized in a two-step process, either in bulk or in solution, by free radical initiated copolymerization of (A), (B), (C), (D), and (E) followed by reaction with ($M_v$).

The above-described prepolymer, containing ethylenically unsaturated groups, can be cured to a crosslinked homopolymerization product when the prepolymer is subjected to free radical polymerization induced by heat or UV irradiation.

Said prepolymer can also be cured to a crosslinked copolymerization product when the prepolymer is polymerized in combination with other vinyl monomers (M-2), such as those described for components (A), (B) and (D) for the prepolymers.

Preferably the crosslinked product is the homopolymerization product of the prepolymer; or is the copolymerization product of (a) 95 to 70% by weight of prepolymer, and (b) 5 to 30% by weight of comonomer (M-2); most preferably, the copolymerization product of (a) 90 to 75% by weight of prepolymer, and (b) 10 to 25% by weight of comonomer (M-2).

These crosslinked products are useful as coatings, films or shaped articles, particularly in biomedical devices and especially in contact lenses.

The vinyl-telechelic poly-(alkylene oxides) can be used singly or in combination with each other.

Monomer A

The fluorinated and/or silicone containing monomers (A) useful for making the novel polymers of this invention are acrylic or styrenic monomers. Fluorine-containing monomers (A-1) are vinyl monomers containing at least three fluorine atoms consisting of hexafluoroisopropyl acrylate or methacrylate, perfluorocyclohexyl acrylate or methacrylate, 2,3,4,5,6-pentafluorostryene or the acrylate or methacrylate esters or amides of the formula

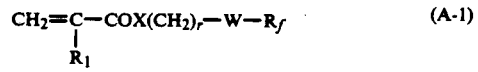

wherein
$R_f$ is $-(CF_2)_tCF_2L$ or $-(CF_2CF_2)_qOCF(CF_3)_2$
$R_1$ is hydrogen or methyl,
X is oxygen or $-NR_7-$ wherein $R_7$ is hydrogen or an alkyl group with 1–5 carbon atoms.
r is an integer from 1–4,
t is an integer from 0–14,
q is an integer from 1–3,
L is hydrogen or fluorine, with the proviso that, when t is 0, L is fluorine, and
W is a direct bond or a divalent group of the structure $-NR_7-CO-$; $-NR_7SO_2-(CH_2)_r-$; $-NR_7SO_2-$;

$-S-(CH_2)_r-$; $-NH(CH_2)_r-NR_7-(CH_2)_r-NR_7SO_2-$;

$-NH(CH_2)_rNR_7SO_2-CH_2-$ or $-CF(CF_3)(OC_3F_6)_q-O-$.

Typical examples are 1,1,2,2-tetrahydroperfluorodecyl acrylates and methacrylate, 1,1,2,2-tetrahydroperfluorooctyl acrylate and methacrylate and N-(1,1,2,2 tetrahydroperfluorooctyl)-methacrylamide or acrylamide.

Other useful fluorinated monomers include hexafluoroisopropyl acrylate, hexafluoroisopropyl methacrylate, perfluorocyclohexyl methacrylate, and 2,3,4,5,6-pentafluoro-styrene; the acrylates and methacrylates of fluoroalkyl substituted amido-alcohols, such as of $C_7F_{15}CON(C_2H_5)C_2H_4OH$; of sulfonamido-alcohols, such as of $C_8F_{17}C_2H_4SO_2N(CH_3)$—$C_4H_8OH$ and $C_8C_{17}SO_2N(C_2H_5)C_2H_4OH$; of perfluoroether alcohols, such as of $C_3F_7$—$O(C_3F_6O)_2CF(CF_3)$—$CH_2OH$ or $(CF_3)_2CFO(CF_2CF_2)_2$—$CH_2CH_2OH$; and the acrylates and methacrylate of fluorinated thioether alcohols of structure $CF_3(CF_2)_rCH_2CH_2SCH_2CH_2CH_2OH$; acrylates and methacrylates of sulfonamido-amines, such as of $R_fSO_2N(CH_3)CH_2CH_2N(CH_3)(CH_2)_3NH_2$ and $R_fCH_2SO_2NH(CH_2)_2NH_2$; of amido-amines, such as of $R_fCONH(CH_2)_2NH_2$; as well as the vinyl monomers obtained by reaction of these aforementioned fluorinated alcohols and amines with 2-isocyanatoethyl acrylate or methacrylate or m-isopropenyl-α,α-dimethylbenzyl isocyanate.

Preferred are fluorinated monomers in which X is oxygen, W is a direct bond, r is 1 or 2, t is 1 to 10 and L is fluorine.

Preferred are hexafluoroisopropyl methacrylate, trifluoroethyl methacrylate, and 1,1,2,2-tetrahydroperfluorooctyl and 1,1,2,2-tetrahydroperfluorodecyl acrylate and methacrylate, with 1,1,2,2-tetrahydroperfluorooctyl acrylate being most preferred.

Useful silicon containing monomers, A-2, are acrylates and methacrylates of siloxy group substituted alkanols with at least 2-10 silicon atoms, for instance oligosiloxanyl-alkyl esters of formula:

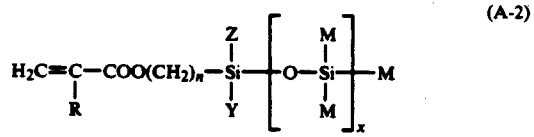
(A-2)

wherein Z and Y are methyl, phenyl or Q where Q is

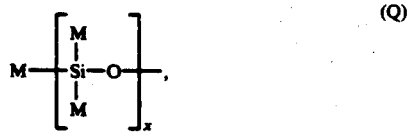
(Q)

wherein
M is methyl or phenyl,
n is 2 to 4,
x is 0 to 6, with the proviso that if x=0, at least one of Z or Y is Q, and
R is hydrogen or methyl.

Also useful are the corresponding mono- or diitaconates.

Typical representatives include: tris(trimethylsiloxysilyl)propyl (meth)-acrylate, triphenyldimethyl disiloxanylmethyl (meth)acrylate, pentamethyl- disiloxanylmethyl (meth)acrylate, tert-butyl-tetramethyldisiloxanylethyl(meth)acrylate, methyl-di(trimethylsiloxy)-silylpropylglyceryl (meth)-acrylate; pentamethyl-disiloxanyl-methyl methacrylate; heptamethyl-cyclotetrasiloxy-methyl methacrylate; heptamethyl-cyclotetrasiloxy-propyl methacrylate; (trimethylsilyl)-decamethyl-pentasiloxy-propyl methacrylate; dodecamethyl-pentasiloxypropyl methacrylate.

The preferred comonomer A-2 is tris-(trimethylsiloxysilyl)-propyl methacrylate.

Monomer B

Useful monomers B are aprotic, water soluble monomers, like N,N-dimethylacrylamide, N-vinylpyrrolidone and N-vinyl acetamide.

Preferred monomer B is N,N-dimethylacrylamide.

Monomer C

Useful are hydroxy and amino-substituted vinyl monomers, among them: 2-hydroxyethyl-, 2 or 3-hydroxypropyl-, 4-hydroxybutyl acrylate and methacrylate; glycerol methacrylate; N-2-hydroxyethyl- and N-3-hydroxypropyl methacrylamide; 2-hydroxyethyl and 4-hydroxybutyl vinyl ether; bis-hydroxyethyl maleate and fumarate; N-tert-butyl-aminoethyl methacrylate, and aminostyrene; also acrylic and methacrylic acid and di, tri-, tetra- and polyethylene glycol acrylates and methacrylates.

Preferred monomers C are 2-hydroxyethyl methacrylate and N-tert-butyl aminoethyl methacrylate.

Monomers D

The monomers (D) which can be present in the polymers of this invention can be any other copolymerizable vinyl monomer, like an alkyl ester or amide of acrylic or methacrylic acid with from 1-20 carbon atoms in a linear or branched aliphatic, cycloaliphatic or aromatic group containing ester or amide group, and which may be interrupted by hetero atoms like sulfur or oxygen; analogous mono- or di-esters of maleic and itaconic acid; alkyl vinyl ethers with 1 to 10 carbon atoms in the alkyl group, vinyl esters of $C_1$ to $C_{12}$-carboxylic acids, styrene and alkyl substituted styrene and α-methylstyrene; N-alkyl-acrylamides and methacrylamides, N-alkyl and N,N-dialkylamino-alkyl methacrylates and methacrylamides.

Representative examples include: methyl acrylate, ethylacrylate, n- and isopropyl acrylate, cyclohexyl acrylate, trimethyl-cyclohexyl acrylate, phenyl acrylate, benzyl acrylate, octyl acrylate, 2-ethylhexyl acrylate and all the corresponding methacrylates, furfuryl acrylate and methacrylate; methoxy-ethyl-, ethoxy-ethyl-, butoxy-ethyl- and ethoxy-ethoxy ethyl acrylate and methacrylate; glycidyl methacrylate; N-isopropyl-acrylamide; dimethylamino-ethyl methacrylate and methacrylamide.

Chain Transfer Agent E

Many compounds can act as chain transfer agents, as known to those skilled in the art of free-radical initiated polymerization, and include, most typically, halogenated molecules and thiols.

Especially useful chain transfer agents E are thiols like: alkyl thiols, where alkyl is a linear or branched hydrocarbon residue with 3-21 carbon atoms; thioglycerol; mercaptoethanol; mercaptoacetic acid; mercapto- propionic acid, mercaptomaleic acid; cysteine, mercapto-N,N-dimethyl-aminoethylene. Also useful are fluorinated thiols like $C_{3-14}F_{7-29}$-ethyl mercaptans.

Preferred are $C_5$–$C_{14}$-alkyl mercaptans and $C_4$–$C_{12}$-perfluoroalkyl ethyl mercaptans and especially $C_6F_{13}CH_2CH_2SH$.

Monomer $M_v$

Vinyl unsaturated isocyanates useful to react with the reactive prepolymer [A-B-C-D-E] are 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

Such compounds and their preparation are disclosed, for example, in U.S. Pat. No. 2,718,516 and British Patent No. 1,252,099.

Other useful isocyanates include isocyanatoalkyl vinyl ethers, such as 2-isocyanatobutyl vinyl ether, and styrene isocyanate and m-isopropenyl-alpha,alpha-dimethylbenzyl isocyanate. Also useful are isocyanates obtained by the reaction of one mole of a hydroxy- or aminoalkyl acrylate or methacrylate with one mole of a diisocyanate of structure $R_3(NCO)_2$.

$R_3$ is a divalent radical derived from an aliphatic, cycloaliphatic or aromatic diisocyanate. Examples of such useful acrylates and methacrylates include 2-hydroxyethyl methacrylate, 2-hydroxyethyl acrylate, 3-hydroxypropyl methacrylate, or t-butylaminoethyl methacrylate; suitable diisocyanates include isophorone diisocyanate, (3,3,4)-trimethylhexane-1,6-diisocyanate, toluene diisocyanate, diphenylmethane-4,4'-diisocyanate and the like.

Most preferred are 2-isocyanatoethyl methacrylate and m-isopropenyl-$\alpha,\alpha$-dimethylbenzyl isocyanate.

The compounds A, B, C, D, E and $M_v$ are present in the prepolymers of this invention in amounts where
(A) is 30–69.5% by weight;
(B) is 69.9 to 30% by weight;
(C) is 0.5 to 25% by weight;
(D) is 0 to 30% by weight;
(E) is 0 to 10 mol % (of monomers)
($M_v$) is 0.2 to 10 mol % (of monomers).
Preferred are prepolymers, where
(A) is 30 to 69%,
(B) is 69 to 30%,
(C) is 1 to 20%,
(D) is 0 to 25%,
(E) is 0 to 5 mol %, and
($M_v$) is 0.5 to 6 mol %.
Most preferred are prepolymers, where
(A) is 40 to 55%,
(B) is 55 to 40%,
(C) is 5 to 15%,
(D) is 0 to 15%,
(E) is 0 to 2 mol %, and
($M_v$) is 1 to 5 mol %.

It has further been discovered, that fluorine and/or silicone containing reactive prepolymers, which are not hydrophilic can be made by the same 2-step process. Such reactive prepolymers are thus another object of this invention, consisting of
(A) 20–79.5% by weight of a silicon or fluorine containing vinyl monomer or mixture thereof,
(C) 0.5–25% by weight of a vinyl monomer containing an active hydrogen atom, or mixtures thereof,
(D) 20–79.5% by weight of an ethylenically unsaturated monomer or mixtures thereof, other than monomers of component (A) or (C),
(E) 0 to 10 mol %, based on the total moles of components (A), (C), (D) and (E) of a chain transfer agent, and
($M_v$) 0.2–10 mol %, based on the total moles of components (A), (C), (D) and (E) of an ethylenically unsaturated isocyanate.

Such fluorine or silicon containing reactive prepolymers are useful, either by themselves or in combination with other copolymerizable monomers (M-2) as heat or a UV-curable protective coatings or films.

The fluorine and/or silicone containing prepolymers can be used either by themselves as UV-curable components, or they can preferably be copolymerized with 5 to 60% by weight of one or more copolymerizable vinyl monomer, M-2.

Useful comonomers M-2 are the ones already described as prepolymer components A, B, C, and D and may be either the same or different from the ones used for the prepolymer synthesis.

Included among the useful monomers are: methyl-; ethyl-; propyl-; isopropyl-; butyl-; isobutyl-; tert-butyl-; 2-ethoxyethyl; 2-methoxyethyl-; benzyl-; 4-t-butylphenyl-, cyclohexyl-; trimethylcyclohexyl-; isobornyl-; dicyclopentadienyl-; norbornylmethyl-; cyclododecyl-; 1,3,3-tetramethylbutyl-; n-butyl-; n-octyl-; 2-ethylhexyl-; decyl-; dodecyl-; tridecyl-; octadecyl-; glycidyl-; ethylthioethyl-; furfuryl-; 2-butoxyethyl, 2-(2-ethoxyethoxy)-ethyl; hexafluoroisopropyl-; 1,1,2,2-tetrahydroperfluorododecyl-; tri-, tetra- or penta-siloxanyl propyl acrylates and methacrylates, as well as the corresponding amides; N-(1,1-dimethyl-3-oxobutyl)acrylamide; mono- and dimethyl fumarate, maleate and itaconate; diethyl fumarate, isopropyl and diisopropyl fumarate and itaconate; mono- and diphenyl and methylphenyl fumarate and itaconate, methyl vinyl ether and methoxyethyl vinyl ether; vinyl acetate; vinyl propionate, vinyl benzoate; acrylonitrile, styrene, alpha-methylstyrene and tert-butylstyrene, 2-hydroxyethyl-, 2- and 3-hydroxypropyl-, 2,3-dihydroxypropyl-, polyethoxyethyl-, and polyethoxypropyl acrylates and methacrylates as well as the corresponding acrylamides and methacrylamides, sucrose-, mannose-, glucose-, sorbitol acrylates and methacrylates; and di-(2-2-hydroxyethyl) maleate; acrylamide and methacrylamide, N-methylacrylamide and methacrylamide, bisacetoneacrylamide, methylolacrylamide and methacrylamide; vinylformamide and vinylacetamide, N,N-dimethyl- and N,N-diethyl-aminoethyl acrylate and methacrylate as well as the corresponding acrylamides and methacrylamides, N-tert-butylaminoethyl methacrylate and methacrylamide, 2- and 4-vinylpyridine, 4- and 2-methyl-5-vinylpyridine, N-methyl-4-vinyl piperidine, 1-vinyl- and 2-methyl-1-vinylimidazole, para- and orthoaminostyrene, dimethylaminoethyl vinyl ether, N-vinylpyrrolidone, and 2-pyrrolidinoethyl methacrylate; acrylic and methacrylic acid, itaconic-, cinnamic-, crotonic-, fumaric-, and maleic acids and lower hydroxyalkyl mono- and diesters thereof, such as 2-hydroxyethyl- and di(2-hydroxyethyl) fumarate, -maleate and -itaconate, and 3-hydroxypropyl-butyl fumarate, and di(polyalkoxy)alkyl fumarates, maleates and itaconates; maleic-anhydride, sodium acrylate and methacrylate, 2-methacryloyloxyethylsulfonic acid, 2-acrylamido-2-methylpropanesulfonic acid, 2-phosphatoethyl methacrylate, vinylsulfonic acid, sodium vinylsulfonate, p-styrenesulfonic acid, sodium p-styrenesulfonate, and allylsulfonic acid.

Also included are the quaternized derivatives of cationic monomers obtained by quaternization with selected alkylating agents like halogenated hydrocarbons such as methyl iodide, benzyl chloride or hexadecyl chloride; epoxides like glycidol, epichlorohydrin, ethylene oxide; acrylic acid, dimethyl sulfate; methyl sulfate, and propane sultone.

In addition to the mono-vinyl compounds described above, M-2 can include di- and polyvinyl monomers like:

Allyl acrylate and methacrylate, ethylene glycol-, diethylene glycol-, triethylene glycol-, tetraethylene glycol-, and generally polyethylene oxide glycol diacrylates and dimethacrylates; 1,4-butanediol and poly-n-butylene oxide glycol diacrylates and dimethacrylates; propylene glycol and polypropylene oxide glycol diacrylates and dimethacrylates; thiodiethylene glycol diacrylate and dimethacrylate; neopentylene glycol diacrylate and dimethacrylate; trimethylolpropane tri- and tetraacrylate; pentaerythritol tri- and tetraacrylate; divinylbenzene; divinyl ether; divinyl sulfone; disiloxanyl-bis-3-hydroxy propyl diacrylate or methacrylate; bisphenol A diacrylate or dimethacrylate; ethoxylated bisphenol A diacrylate or dimethacrylate; methylene bisacrylamide or methacrylamide, dimethylene bisacrylamide or methacrylamide; N,N'-dihydroxyethylene bisacrylamide or methacrylamide; hexamethylene bisacrylamide or methacrylamide; decamethylene bisacrylamide or methacrylamide; allyl- and diallyl maleate, triallyl melamine, diallyl itaconate, diallyl phthalate, triallyl phosphite, polyallyl sucrose, sucrose diacrylate, glucose dimethacrylate; also, unsaturated polyesters, such as poly-(alkylene-glycol maleates) and poly(alkylene-glycol fumarates), like poly(propylene glycol maleate) and poly(polyalkyleneoxide glycol maleate) and polyalkyleneoxideglycol-dimethacrylates.

Preferably, the copolymerizable comonomers M-2 are present in amounts of 5-30% by weight most preferably 10-25% by weight.

Synthesis

The reactive silicone and fluorine containing prepolymers of this invention are synthesized in a 2-step process via conventional free-radical polymerization, as known to those skilled in the art; in a first step, monomers A, B, C, D and chain transfer agent E are mixed together with a free-radical generating initiator and co-polymerized, either in bulk or in solution. Many thermally decomposing initiator can be used for thermal polymerization, such as peroxides and azo compounds: having half-life at the polymerization temperature of at least 20 minutes. Typical useful peroxy compounds include isopropyl percarbonate, tert-butyl peroctoate, benzoyl peroxide, lauryl peroxide, decanoyl peroxide, acetyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis-(2-ethylhexanoylperoxy)hexane, p-chlorobenzoyl peroxide, tert-butylperoxybutyrate, tert-butyl peroxymaleic acid, tert-butylperoxyisopropyl carbonate, bi(1-hydroxycyclohexyl) peroxide, azo compounds include 2,2-azo-bisisobutyronitrile; 2,2'-azo-bis(2,4-dimethylvaleronitrile); 1,1'-bis(cyclohexane carbonitrile); and 2,2'-azo-bis(2,4-dimethyl-4-methoxy-valeronitrile).

For UV initiated polymerization, photoinitiator such as diethoxyacetophenone, 1-hydroxycyclohexyl phenyl ketone, 2,2-dimethoxy-2-phenylacetophenone, phenothiazine, diisopropylxanthogen disulfide, benzoin and benzoin derivatives can be used.

The amount of initiator can vary from 0.002 to 4% by weight of monomers or monomer solution and is advantageously added incrementally to the reaction vessel or continuously. Preferably the reaction is carried out in an aprotic solvent. Useful solvents are ethers, like diethyl ether, ethyleneglycol-dimethyl ether; diethylene glycol-dimethyl ether; ester like ethyl acetate or isopropyl acetate; ketones like acetone, methyl ethyl ketone, methyl isopropyl ketone or methyl isobutyl ketone; lactams and lactones like N-methylpyrrolidone and γ-butyrolactone; dimethyl sulfoxide; amides, like N,N-dimethylformamide and N,N-dimethylacetamide; chlorinated solvents, like 1,1,1-trichloroethane or chloroform; aromatic solvents like toluene or benzene.

If the polymer is prepared in bulk, in order to carry out step 2 of the synthesis, it has to be dissolved in one of the aprotic solvents or in an aprotic comonomer, which may be the same or different from A, B or D and functions as component M-2. The concentration of step-1 polymer in the solvent or aprotic monomer should be low enough to result in an easily stirrable solution.

For step two of the synthesis, the required amount of $M_v$ is added to the step-2 prepolymer solution. If the second step consists of a urethane bond formation, an amino- or metal catalyst is preferably used, like triethylamine, pyridine or dibutyltin dilaurate or stannous octoate. The reaction temperature can vary from room temperature to about 80° C. If an urea bond is formed during the second step no catalyst is required. The step-2 reaction is carried out until no NCO-groups are detectable by IR-analysis.

The final polymerization step is preferably carried out by UV-initiated polymerization using photoinitiators. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and α-methylbenzoin; diketones such as benzil and diacetyl, etc.; ketones such as acetophenone, α,α,α-tribromoacetophenone, α,α,-diethoxyacetophenone (DEAP), 2-hydroxy-2-methyl-1-phenyl-1-propanone, o-nitro- α,α,α-tribromoacetophenone, benzophenone and p,p'-tetramethyldiaminobenzophenone; α-acryloxime esters such as benzil-(0-ethoxycarbonyl)-α-monoxime; ketone/amine combinations such as benzophenone/N-methyldiethanolamine, benzophenone/tributylamine and benzophenone/Michler's ketone; and benzilketals such as benzildimethylketal, benzildiethylketal and 2,5-dichlorobenzildimethylketal. Normally, the photoinitiator is used in amounts ranging from about 0.01 to 5% by weight of the total oligomeric composition.

Preferably, about 0.15 to 1.0% of photoinitiator is used in the polymerizable compositions.

Polymerization may be carried out in bulk in a conventional manner or in the presence of a solvent, as have been for instance described above, but which may also contain active hydrogen atoms.

Useful solvents include ketones, like acetone, methyl ethyl ketone, methyl isopropyl ketone, methyl isobutyl ketone and cyclohexane; alcohols like ethanol, isopropanol or ethyl-cellosolve, ethers like ethylene glycol or diethyleneglycol-dimethyl ether; ester like ethyl acetate or isopropyl acetate; dimethyl sulfoxide; N-methylpyrrrolidone; N,N-dimethyl formamide; N,N-dimethylacetamide and the like, and water.

The polymerization is carried out in molds, which can consist of plastics, glass or metal and can be any shape. For making films and sheets, the molds are preferably made of glass plates and lined with MYLAR or other polymer films and held together by clamps, using a spacer of desired thickness. Contact lenses are preferably prepared in UV-permeable plastic molds.

Other free radical generating mechanisms can be employed, such as x-rays, electron-beams and UV-radiation. Preparation of fully molded contact lenses by UV-radiation in the presence of a photoinitiator such as diethoxyacetophenone, 1-hydroxycyclohexyl phenyl ketone, 2,2-dimethoxy-2-phenylacetophenone, phenothiazine, diisopropylxanthogen-disulfide, benzoin and benzoin derivatives is a preferred method.

After polymerization is complete, the polymer is removed from the mold and any solvent present is either removed by vacuum drying or extraction with water and with water-soluble solvents, or water-solvent mixtures. Useful solvents are acetone, ethanol, methanol, isopropanol and the like. Azeotropic distillation is also a useful procedure to remove certain solvents. After the solvent is removed, the polymer is equilibrated in distilled water and its water content is determined gravimetrically. All subsequent measurements are carried out on the water-equilibrated polymers.

The polymerization can also be carried out in form of a coating on a substrate, like glass, plastic, metal, wood or the like, using conventional high-speed UV-curing technology.

The following examples further illustrate the usefulness of the invention.

Oxygen permeability is determined with a $O_2$-Permeometer-Model 201-T (Createch), using buffered saline (pH=7) as electrolyte and is expressed in units.

$$O_2 \cdot DK \text{ (barrers)} = \frac{cm^3(STP)cm \cdot 10^{-10}}{cm^2 \cdot cm \cdot cm\ Hg} \text{ at a given thickness and temperature}$$

Physical-mechanical measurements—tensile strength, Young's Modulus and elongation, (E)—are carried out with an INSTRON testing apparatus, model 1123 on 0.6–1 mm thick sheets.

Water content is expressed as:

$$\% H_2O = \frac{\text{weight of swollen polymer} - \text{weight of dry polymer}}{\text{weight of swollen polymer}}$$

EXAMPLE 1

1a: Synthesis of Step-1 Prepolymer 29.7 g Dimethylacrylamide (DMA), 25.3 g tris-(trimethylsiloxy-)silylpropyl methacrylate ($Si_4MA$) and 1.85 g (0.01 mol) N-t-butylaminoethyl methacrylate (t-BAMA) is dissolved in 114 g dry isopropyl acetate in a 3-necked reaction flask equipped with $N_2$-inlet tube, thermowatch, reflux coburner and stirrer. The flask is purged with dry nitrogen. 0.29 g 2,2'-Azobis-(2,4-dimethylvaleronitrile) (VAZO 52) are added and the mixture is stirred at 60° for 24 hours. A 33.5% solids prepolymer solution is obtained, indicating essentially complete conversion.

The step-1 prepolymer has a composition, in mol %, of: $DMA/Si_4MA/t\text{-}BAMA = 81.1/16.2/2.7$.

1b: Synthesis of Vinyl-functional Prepolymer (Step-2)

To 19.4 g (0.034 equivalent amine) of the step-1 prepolymer (58.4 g of a 33.2% solution) are added in a bottle 0.26 g (0.0017 equiv.) 2-isocyanatoethyl methacrylate (IEM), dissolved in 0.52 g dry methyl ethyl ketone. The mixture is stirred with a magnetic stir bar for 24 hours after which time all NCO- has disappeared, as determined by IR-analysis. The methacrylate functional prepolymer solution is stored under $N_2$ in a refrigerator. The prepolymer has a composition in mol % of: $DMA/Si_4MA/t\text{-}BAMA/t\text{-}BAMA+IEM = 81.1/16.2/1.35/1.35$

EXAMPLE 2

Using the procedure of Example 1, a step-1 prepolymer is prepared from 12.5 g DMA, 11.0 g $Si_4MA$, 1.5 g t-BAMA and using in addition 0.97 g (3 mol %) dodecyl mercaptan (OM) as chain transfer agent and 17.3 g dry methyl ethyl ketone as solvent.

A 60.6% prepolymer solution is obtained, the step-1 prepolymer has a composition, in mol %, of: $DMA/Si_4MA/t\text{-}BAMA/DM = 76.4/15.7/4.9/3.0$.

Subsequently, this prepolymer is reacted, as described in Example 1, with IEM to form a vinyl-substituted prepolymer with a composition, in mol %, of: $DMA/Si_4MA/t\text{-}BAMA/DM/t\text{-}BAMA+IEM = 76.4/15.7/1/3.01/2.4$.

EXAMPLE 3

Using the procedure of Example 1, a step-1 prepolymer is prepared from 14.9 g DMA, 12.7 g $Si_4MA$ and 1.95 g 2-hydroxyethyl methacrylate (HEMA) and using 29.5 g methyl ethyl ketone (MEK) as solvent.

From the step-1 prepolymer, the vinyl substituted prepolymer is prepared, as a 50% solution in MEK, as described in Example 1b, using 0.01 g dibutyltin dilaurate (DBTL) as catalyst, and with a composition, in mol %, of: $DMA/Si_4MA/HEMA/HEMA+IEM = 76.9/15.4/3.4/3.3$.

EXAMPLE 4

From the step-1 prepolymer of Example 3, a methacrylate terminated prepolymer was described in Example 3b, but having a composition, in mol %, of: $DMA/Si_4MA/HEMA/HEMA+IEM = 76.9/15.4/4.9/1.4$.

EXAMPLE 5

Using the procedure of Example 1a, a step-1 prepolymer is prepared as a 60% solution in dry MEK, having the following composition, in mol %: $DMA/R_fA/t\text{-}BAMA/DM = 79.1/12.9/5.04/3.0$.

$R_fA$ is a mixture of perfluoroalkyl-ethyl acrylates with a perfluoroalkyl chain length distribution of $C_6F_{13}/C_8F_{17}/C_{10}F_{21}/$ in weight % ratios of 5.4/72.8/20/8; DMA, t-BAMA and DM are dimethylacrylamide. t-butylaminoethyl methacrylate and dodecyl mercaptan.

Using the procedure of Example 1b, a vinyl substituted fluorinated prepolymer is prepared as a 60% solution in MEK, having a composition, in mol %, of $DMA/R_fA/t\text{-}BAMA/DD/t\text{-}BAMA+IEM$ of: 79.1/12.9/2.5/3.0/2.54.

EXAMPLE 6

Using the procedure of Example 1a, a step-1 prepolymer is prepared as a 50% solution in MEK, having the following composition, in mol %: DMA/R$_f$A/HEMA=79.7/13.0/7.3.

Using the procedure of Example 1b and 0.01 g DBTL as catalyst, a vinyl substituted fluorinated prepolymer is prepared as a 50% solution in MEK, having a composition in mol %, of:

DMA/R$_f$A/HEMA/HEMA+IEM=79.7/13.0/3.65/3.65.

EXAMPLE 7

Using the procedure described in Example 1a and 1b, a di-styryl functional prepolymer is prepared by using an equivalent amount of m-isopropenyl-α,α-dimethylbenzyl isocyanate (TMI) instead of 2-isocyanatoethyl methacrylate (IEM). The obtained prepolymer has the composition, in mol % of DMA/Si$_4$MA/t-BAMA/t-BAMA+TMI=81.1/16.2/1.35/1.35.

EXAMPLE 8

Using the procedure described in Example 5, a di-styryl functional prepolymer is prepared by using an equivalent amount of TMI instead of IEM. The obtained prepolymer has the composition, in mol % of DMA//R$_f$A/t-BAMA/DD/t-BAMA+TMI=79.1/12.9/2.5/3.0/2.54.

EXAMPLE 9

The process of Example 6 is repeated, but using n-perfluorohexylethyl methacrylate as fluorinated comonomer.

EXAMPLE 10

The process of Example 6 is repeated, but using heptafluoropropylmethyl methacrylate (F$_7$MA) as fluorinated comonomer and using an amount of 2-isocyanatoethyl methacrylate (IEM) to give a prepolymer with a composition in mol % of:

DMA/F$_7$MA/HEMA/HEMA+IEM=80/12.5/5.65/1.85.

EXAMPLE 11

The process of Example 5 is repeated, but using perfluorooctyl-ethyl methacrylate as fluorinated comonomer.

EXAMPLE 12

Synthesis of Silicone Hydrogels 25 grams of the prepolymer solution of Example 3 are mixed together with 0.2 g benzoin methyl ether and the mixture is degassed in vacuo and sparged with nitrogen. The clear solution is poured in a mold consisting of 2 MYLAR-lined glass plates separated by a 1 mm thick silicone cord spacer and held together by clamps. The filled mold is exposed to UV-radiation from a SYLVANIA-Blacklite lamp for 10 hours; it is then taken apart and the MEK-swollen polymer sheet is released in water and extracted for 48 hours with frequent water change, followed by boiling it in the last water rinse for ½ hour and equilibration in distilled water.

A clear soft and wettable silicone hydrogel is obtained.

EXAMPLE 13

Using the procedure described in Example 12, a silicone hydrogel sheet is prepared, but using 20% by weight methyl methacrylate as a comonomer (M-2).

EXAMPLES 14–17

Using the procedure of Examples 12 and 13, silicone containing hydrogels are synthesized from the methacrylate-prepolymers of Examples 3 and 4; their compositions and properties are listed in the following table, together with those of Examples 12 and 13 and of poly-(2-hydroxy-ethyl methacrylate) hydrogel as control.

| Ex. No. | Prepolymer of Ex. | Composition (%) | Comonomer MMA % | Comonomer F$_7$MA % | H$_2$O % | Tensile Strength (kg/cm$^2$) | Young's Modulus (kg/cm$^2$) | E* % | O$_2$.DK (barrers) |
|---|---|---|---|---|---|---|---|---|---|
| 12 | 3 | 100 | — | — | 42.3 | 5.0 | 9.6 | 174 | 28 |
| 13 | 3 | 80 | 20 | — | 36.6 | 27.0 | 107 | 167 | 20 |
| 14 | 4 | 100 | — | — | 45.3 | 2.9 | 3.9 | 300 | 39 |
| 15 | 4 | 90 | 10 | — | 43.6 | 6.6 | 10.5 | 250 | 31 |
| 16 | 4 | 80 | 20 | — | 37.4 | 29.0 | 16 | 306 | 28 |
| 17 | 4 | 80 | — | 20 | 43.9 | 4.3 | 4.4 | 396 | 42 |
| poly-HEMA | | | | | 39.0 | 5.5 | 9.0 | 70 | 6.5 |

*E is elongation

EXAMPLES 18–22

Synthesis of properties of fluorine containing hydrogels

As described in Examples 12 and 13, hydrogel sheets are prepared and tested, using the fluorinated prepolymers of Examples 6 and 10. Their composition and properties are listed in the following table, together with those of poly-(2-hydroxy ethyl methacrylate) hydrogel as control.

| Ex. No. | Prepolymer of Ex. | Composition % | Comonomer MMA % | Comonomer Si$_4$MA % | H$_2$O % | Tensile Strength (kg/cm$^2$) | Young's Modulus (kg/cm$^2$) | E* % | O$_2$.DK (barrers) |
|---|---|---|---|---|---|---|---|---|---|
| 18 | 6 | 100 | — | — | 46.4 | 3.3 | 22.5 | 22 | 10 |
| 19 | 6 | 90 | 10 | — | 43.5 | 6.8 | 33.0 | 44 | 15 |
| 20 | 10 | 100 | — | — | 51.6 | 1.0 | 1.8 | 138 | 23 |
| 21 | 10 | 80 | 20 | — | 42.4 | 25.0 | 14.0 | 188 | 5 |

| Ex. No. | Composition | | | | Tensile Strength (kg/cm²) | Young's Modulus | E* % | O₂.DK (barrers) |
|---|---|---|---|---|---|---|---|---|
| | Prepolymer of Ex. , % | Comonomer MMA % | Si₄MA % | H₂O % | | | | |
| 22 | 10    80 | — | 20 | 50.6 | 1.5 | 2.3 | 174 | 57 |
| | poly-HEMA | | | 39.0 | 5.5 | 9.0 | 70 | 6.5 |

*E is elongation

The following examples demonstrate the synthesis of non-hydrophilic prepolymers and coatings.

EXAMPLE 23

Using a 50 cc screw-cap bottle with a magnetic stir bar, 5 g C₆F₁₃-ethyl methacrylate, 2.4 g methyl methacrylate and 1.0 g 2-hydroxyethyl methacrylate are dissolved in 8.,4 g methyl-propyl ketone; 0.02 g azo-bis-isobutyrolnitrile are added and dissolved and the mixture is sparged with nitrogen, the bottle is immersed in a thermostated glycol bath and the mixture is stirred at 65° C. for 18 hours; the mixture is allowed to cool to room temperature; A viscous, 50% solution of step-1 prepolymer is obtained.

To this solution are added 1.0 g 2-isocyanatoethyl methacrylate and 0.001 g dibutyltin dilaurate; the mixture is stirred at room temperature for 10 hours, after which time no free NCO groups are detectable by IR, indicating the presence of the methacrylate-functional, fluorine containing prepolymer.

0.5 g DARACURE-1173 are dissolved in the mixture and a coating 1) deposited on MYLAR film and exposed to UV radiation for 2 hours. After evaporation of the solvent a hard, non-wettable and oil-repellent coating is obtained.

EXAMPLE 24

Using the procedure of Example 23, a copolymer of 5 g tris(trimethyl siloxy) silyl-propyl methacrylate, 2 g lauryl methacrylate and 1 g 2-hydroxyethyl methacrylate is prepared and reacted with 1 g 2-isocyanatoethyl methacrylate. After all NCO has reacted, 0.5 g DARACURE-1173 are added and after coating on MYLAR and UV-irradiation, a soft, tacky coating of the silicone containing polymer is obtained.

EXAMPLE 25

To 2 g of the DARACURE-1173 containing mixture of Example 23, is added 2 g N,N-dimethylacrylamide. The solution is filled into a MYLAR-lined glass mold of 0.5 mm thickness and irradiated by UV light for five hours. After opening the mold, a soft gel is obtained and equilibrated in water to yield a hydrogel with 55% water content.

What is claimed is:

1. A hydrophilic prepolymer containing silicon or fluorine or both silicon and fluorine as well as ethylenically unsaturated groups, which is the reaction product of the random copolymer of, the weight percent amounts of components (A), (B), (C), (D) and (E) being based on the total amount of said components,
    (A) 20 to 79.5% by weight of a silicon or fluorine containing vinyl monomer or mixtures thereof,
    (B) 79.5 to 20% by weight of N N-dimethyl acrylamide N-vinyl pyrrolidone or N-vinylacetamide or mixtures thereof,
    (C) 0.5 to 25% by weight of a vinyl monomer containing an active hydrogen atom or mixtures thereof,
    (D) 0 to 30% by weight of an ethylenically unsaturated monomer or mixtures thereof other than a monomer of component (A), (B) or (C),
    (E) 0 to 10 mol %, based on the total moles of components (A), (B), (C), (D) and (E) of a chain transfer agent, with
    ($M_v$) 0.2 to 10 mol %, based o the total moles of components (A), (B), (C), (D) and (E), of an ethylenically unsaturated isocyanate.

2. A prepolymer according to claim 1 wherein the fluorine containing monomer of component (A) contains at least three fluorine atoms and consists of hexafluoroisopropyl acrylate or methacrylate, perfluorocyclohexyl acrylate or methacrylate, 2,3,4,5,6-pentafluorostryene or the acrylate or methacrylate esters or amides of the formula

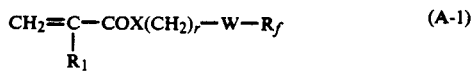

(A-1)

wherein
$R_f$ is $-(CF_2)_tCF_2L$ or $-(CF_2CF_2)_qOCF(CF_3)_2$
$R_1$ is hydrogen or methyl,
X is oxygen or $-NR_7-$ wherein $R_7$ is hydrogen or an alkyl group with 1-5 carbon atoms.
r is an integer from 1-4,
t is an integer from 0-14,
q is an integer from 1-3,
L is hydrogen or fluorine, with the proviso that, when t is 0, L is fluorine, and
W is a direct bond or a divalent group of the structure $-NR_7-CO-$; $-NR_7SO_2-(CH_2)_r-$; $-NR_7SO_2-$;

$-S-(CH_2)_r-$; $-NH(CH_2)_r-NR_7-(CH_2)_r-NR_7SO_2-$;

$-NH(CH_2)_rNR_7SO_2-CH_2-$ or $-CF(CF_3)(OC_3F_6)_q-O-$.

3. A prepolymer according to claim 2 where the fluorine containing monomer is of formula A-1 where X is oxygen, r is 1 or 2, W is a direct bond, t is 1 to 10 and L is fluorine.

4. A prepolymer according to claim 2 wherein the fluorine containing monomer is hexafluoroisopropyl methacrylate, 2,2,2-trifluoroethyl methacrylate, 1,1,2,2-tetrahydroperfluorooctyl- or 1,1,2,2-tetrahydroperfluorodecyl acrylate or methacrylate.

5. A prepolymer according to claim 1 wherein the silicon containing monomer A-2 of component (A) contains at least 2 to 10 silicon atoms.

6. A prepolymer according to claim 4 wherein the silicon containing monomer is of formula A-2:

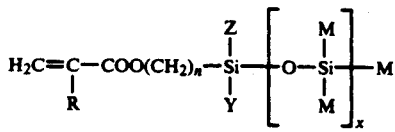 (A-2)

wherein Z and Y are methyl, phenyl or Q where Q is

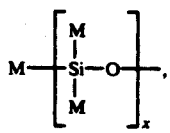 (Q)

wherein
M is methyl or phenyl,
n is 2 to 4,
x is 0 to 6, with the proviso, that if x=0, at least one of Z or Y is Q, and
R is hydrogen or methyl.

7. A prepolymer according to claim 6 wherein the silicon containing monomer A-2 is tris(trimethylsiloxysilyl)propyl methacrylate.

8. A prepolymer according to claim 1 wherein component (B) is N,N-dimethylacrylamide.

9. A prepolymer according to claim 1 wherein the vinyl monomer (C) containing an active hydrogen atom is a hydroxy or amino substituted vinyl monomer selected from the group consisting of 2-hydroxyethyl- 2 or 3-hydroxypropyl-, 4-hydroxybutyl acrylate and methacrylate; glycerol methacrylate; N-2-hydroxyethyl- and N-3-hydroxypropyl methacrylamide; 2-hydroxyethyl and 4-hydroxybutyl vinyl ether; bis-hydroxyethyl maleate and fumarate, N-tert-butyl-aminoethyl methacrylate, and aminostyrene; also acrylic and methacrylic acid and di, tri-, tetra- and polyethylene glycol acrylates and methacrylates.

10. A prepolymer according to claim 9 wherein the monomer (C) containing an active hydrogen atom is 2-hydroxyethyl methacrylate or N-tert-butylaminoethyl methacrylate.

11. A prepolymer according to claim 1 wherein the ethylenically unsaturated vinyl monomer of component (D) is selected from the group consisting of an alkyl ester or amide of acrylic or methacrylic acid with from 1-20 carbon atoms in a linear or branched aliphatic, cycloaliphatic or aromatic group containing ester or amide group and which may be interrupted by hetero atoms like sulfur or oxygen; analogous mono- or diesters of maleic and itaconic acid; alkyl vinyl ethers with 1 to 10 carbon atoms in the alkyl group, vinyl esters of $C_1$ to $C_{12}$-carboxylic acids, styrene and alkyl substituted styrene and α-methylstyrene; N-alkylacrylamides and methacrylamides, N-alkyl and N,N-dialkylamino-alkyl methacrylates and methacrylamides.

12. A prepolymer according to claim 1 wherein the chain transfer agent of component (E) is an alkyl mercaptan having 3 to 21 carbon atoms, thioglycerol, mercaptoethanol, mercaptoacetic acid, mercaptopropionic acid, mercaptomaleic acid, cysteine, mercapto-N,N-dimethylaminoethylene or a $C_{3-14}F_{7-29}$-ethyl mercaptan.

13. A prepolymer according to claim 12 wherein component (E) is $C_5$–$C_{14}$-alkyl mercaptan or a $C_4$–$C_{12}$-perfluoroalkylethyl mercaptan.

14. A prepolymer according to claim 1 wherein component ($M_v$) is 2-isocyanatoethyl methacrylate, 2-isocyanatoethyl acrylate, 3-isocyanatopropyl methacrylate, 1-methyl-2-isocyanatoethyl methacrylate, 1,1-dimethyl-2-isocyanatoethyl acrylate, 2-isocyanatobutyl vinyl ether, styrene isocyanate or m-isopropenyl-alpha,alpha-dimethylbenzyl isocyanate or the reaction product of 2-hydroxyethyl methacrylate with toluene diisocyanate or isophorone diisocyanate in equimolar amounts.

15. A prepolymer according to claim 1 wherein the amounts of (A) to ($M_v$) are
(A) is 30–69.5% by weight;
(B) is 69.9 to 30% by weight;
(C) is 0.5 to 25% by weight;
(D) is 0 to 30 % by weight;
(E) is 0 to 10 mol %
($M_v$) is 0.2 to 10 mol %.

16. A prepolymer according to claim 15 wherein the amounts of (A) to ($M_v$) are
(A) is 30 to 69% by weight,
(B) is 69 to 30% by weight,
(C) is 1 to 20% by weight,
(D) is 0 to 25% by weight,
(E) is 0 to 5 mol %, and
($M_v$) is 0.5 to 6 mol %.

17. A prepolymer according to claim 16 wherein the amounts of (A) to ($M_v$) are
(B) is 55 to 40% by weight,
(C) is 5 to 15% by weight,
(D) is 0 to 15% by weight,
(E) is 0 to 2%, and
($M_v$) is 1 to 5 mol %.

* * * * *